United States Patent
Bilabel

[15] 3,669,272
[45] June 13, 1972

[54] BAND FILTER WITH VACUUM SUCTION CHAMBER

[72] Inventor: Friedrich Bilabel, Im Lohl 12, 674 Landau, Pfalz, Germany

[22] Filed: April 30, 1970

[21] Appl. No.: 33,261

[52] U.S. Cl. .......................................................... 210/152
[51] Int. Cl. ........................................................... B01d 33/00
[58] Field of Search .................. 210/400, 406, 407, 152, 202, 210/215, 216, 297, 386, 387, 409, 532

[56] References Cited

UNITED STATES PATENTS

| | | | |
|---|---|---|---|
| 3,531,404 | 9/1970 | Goodman et al. | 210/400 |
| 3,358,834 | 12/1967 | El-Hindi | 210/387 |

*Primary Examiner*—Reuben Friedman
*Assistant Examiner*—T. A. Granger
*Attorney*—Greene and Durr

[57] ABSTRACT

A vacuum band filter comprises a continuously moving filter band having lower and upper runs with the upper run of the band forming a trough to which is fed the liquid to be filtered, and a vacuum exhaust and liquid collecting chamber disposed below and in liquid-tight engagement with the upper run of the filter band. The section of the band subjected to the vacuum action is divided into filtration and drying zones, and possibly one or more rinsing zones therebetween, with intermixing of the liquids of adjacent zones being prevented by passing the portions of the band intervening between adjacent zones above the preceding liquid level in the filter trough. More particularly, the band, in passing from the filtration zone to a rinsing zone, or in passing from a first rinsing zone to a second rinsing zone, is led roof-fashion above the liquid level, and the band, in passing from the filtration or rinsing zone to the final drying zone, has the end of the trough-shaped section extended upwardly from the liquid level. Preferably, each of the zones has its independent vacuum compartment fitted with individual means to control the degree of the vacuum and to separately discharge the different liquids collected.

9 Claims, 4 Drawing Figures

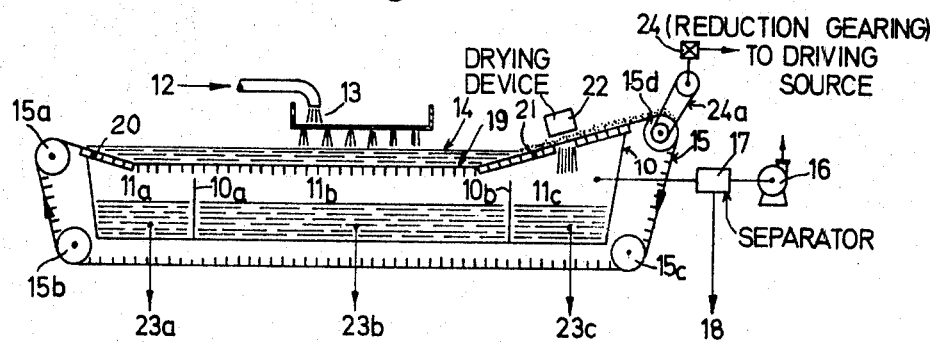
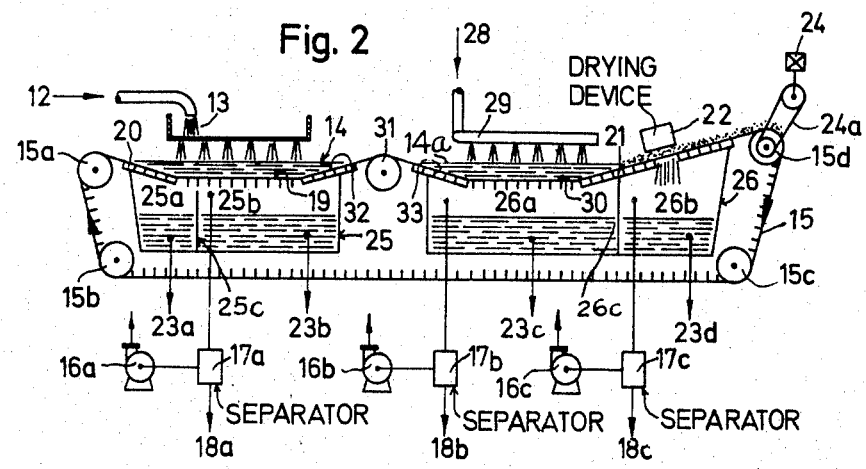
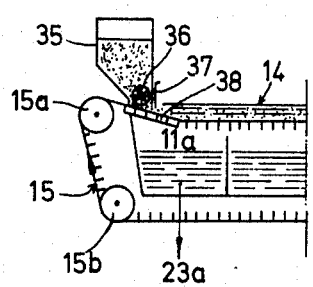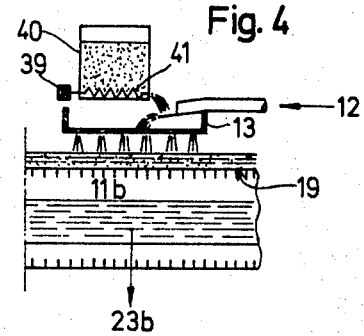

BAND FILTER WITH VACUUM SUCTION CHAMBER

The present invention relates to band filters for the separation of solid matter from a liquid or sludge, more particularly of the type comprising an endless filter band moved continuously over guide and drive rollers, to provide a pair of upper and lower runs of the band, the upper run being formed into a trough for the delivery thereto of the liquid to be filtered or separated into the solid matter, deposited upon the band in the form of a residue and conveyed to a discharge point, and the liquid or filtrate collected in a container disposed below the upper run of said band or trough.

In continuously operating ban filters of the foregoing type, wherein the filtering efficiency is dependent upon the static liquid pressure in the filter trough, the output is rather limited and unsatisfactory for the majority of practical purposes and applications. For this reason, band filters fitted with a vacuum exhaust chamber or container collecting the liquid are employed, that is, filters working with a partial vacuum on the filtrate side of the upper run of the filter band.

At the same time, it is desired in many cases to rinse and/or dry in a single operation the more or less concentrated solid matter or filter residue deposited upon the filter band and still containing a certain amount of the liquid or sludge being filtered.

It is furthermore known to divide the treating bath of the sludge, determined substantially by the length of the filter trough, into filtration, rinsing or washing and drying zones by the provision of retaining walls or dams, and to correspondingly subdivide the filtrate collection chamber below the upper run of the filter band by means of partitions for receiving the liquid coming from the different filtering or treating zones. However, in the case of conventional band filters of this type, it is frequently impossible to prevent the sludges or liquids to be filtered from mixing with the remaining liquids in the zones of the trough formed by the filter band, particularly in the absence of a sufficient quantity of solid residue on the filter band, as is especially the case when starting the filter operation and on account of the irregular residue deposits or distribution encountered frequently in filters of this type.

Moreover, in the case of conventional vacuum band filters divided into different treating (filtering, rinsing, drying) zones, the sealing of the individual zones from each other below the upper run of the band has been found to be insufficient, particularly where different degrees of vacuum are employed for the different zones, in which case considerable amounts of filtrate and rinsing liquid may enter the wrong part of the collecting chamber.

Accordingly, an important object of the present invention is the provision of an improved vacuum band filter construction of the referred to type by which the foregoing and related difficulties and drawbacks inherent in the conventional filter arrangements are substantially eliminated or minimized.

A more specific object of the invention is the provision of a multi-zone vacuum band filter of the referred to type, wherein liquid and/or fluid constituents in the adjoining zones are substantially prevented from intermixing with each other.

Another object of the invention is the provision of multizone vacuum band filter of the referred to type which is self-starting, substantially without any preparatory operations or procedures.

The invention, both as to the foregoing and ancillary objects as well as novel aspects thereof, will be better understood from the following detailed description, taken in conjunction with the accompanying drawing forming part of this disclosure and in which:

FIG. 1 is a diagrammatic elevation of a vacuum band filter constructed in accordance with the principle of the invention and comprising a filtration and a drying zone cooperating with a common vacuum exhaust and filtrate collection chamber;

FIG. 2 is a diagrammatic elevation of another filter construction according to the invention comprising filtration, rinsing and drying zones and separate vacuum exhaust chambers or compartments for said zones; and FIGS. 3 and 4 are fragmentary views of a ban filter according to the previous figures and showing respectively inlet and intermediate filter portions provided with means for supplying auxiliary filter additives or adjuvants.

Like reference numerals denote like parts in the different views of the drawing.

The present invention is especially suitable for use in conjunction with conventional vacuum band filters of the type, as shown and described for instance by German Patent 1,223,806, comprising an endless grid fitted with chain guides at both sides thereof and supporting the filter band proper, a pair of multi-stage liquid sealing gaps disposed at the beginning and end of the filtration trough or region of the grid and band, and a pair of further liquid gap seals disposed along the sides of the band within said region, to complete the seal with the evacuated collection chamber.

With the foregoing objects in view, the present invention involves generally the provision of a vacuum band filter of the type divided into filtration and drying zones and, if desired, one or more additional rinsing zones therebetween, and comprising a vacuum suction or exhaust chamber for collecting the filtrate and disposed below the upper run or trough of the filter band, with improved means to guide the filter band between the zones above the level of the liquid or sludge in the trough formed by said band.

To this end, in a filter embodying a drying zone, the upper run of the filter band is extended in the upwardly inclined end section of the filter trough for forming a drying zone above the surface of the liquid in said trough of the filtration or a rinsing zone, or both, respectively. Moreover, in a band filter incorporating filtration and rinsing zones, the upper run of the filter band is extended roof-fashion above the surface in the filter trough and between the adjacent zones. In other words, there are provided thereby separate filtration and rinsing troughs. The roof-shaped filter portion between the zones may be fitted with liquid gap vacuum seals of conventional construction.

According to an improved feature of the invention, transverse partitions or separating walls are provided in the collecting chamber, to form separate liquid compartments. If the chamber is only partially divided by partitions or retaining walls, an air suction space common to all the zones is formed so that the same degree of vacuum prevails for all the treating zones. On the other hand, in the case of division into closed compartments, coordinated with the respective treating zones, all or each two of the zones are hermetically sealed relative to each other so that the various zones can be operated with different degrees of vacuum, to suit special operating conditions and/or requirements, such for instance as for after-drying.

Due to the passage of the filter band between adjacent treating zones above the level of the liquid in the preceding zone or filter trough, a perfect separation of the operating liquids on the upper run of the filter band is achieved in accordance with the present invention by the aid of simple means requiring relatively little mounting space. Due to the roof-like shape of the band between the filtration and rinsing zones, mixing of the various liquids is avoided as is the penetration of liquid into the drying zone through either a similar roof-like band portion or the upward extension of the end section of the band or trough, respectively.

The arrangement of the filter band, according to the present invention also facilitates the use of auxiliary means or devices necessary in conjunction with many filter processes or liquids, especially where a very high degree of filtering or output is required. For instance, the invention enables the simple and ready application of auxiliary filter additives or adjuvants at the inlet or an intermediate point of the filter trough. As an example, layers of different thicknesses of filter adjuvant may be applied to the filter band by suitable feeding and gauging devices in order to change or set the degree of filter fineness, or for any other purpose, a further advantage resulting from the fact that the zone division according to the invention makes it possible, due to the special arrangement of the filter band, to carry out several operations on the band. These and other advantages and novel features of the invention will become more apparent as the following description proceeds in reference to the drawing.

Referring more particularly to FIG. 1, there is shown at 10 the exhaust and filtrate collecting chamber of a vacuum band filter, said chamber being divided, in the example shown, into three compartments 11a, 11b and 11c by the provision of a pair of partial partitions or dams 10a and 10b, whereby the same degree of vacuum exists in all said compartments. Disposed above the chamber 10 and in vacuum-tight engagement therewith is the upper run of an endless filter band 15 which is formed into a trough having a bottom or section 19 by the provision of suitable inlet and outlet guides 20 and 21, respectively, to which trough is fed the liquid or sludge to be filtered, as indicated by the arrow 12, by way of an inlet conduit and distributor 13, to maintain a normal liquid level 14 in the trough.

The filter band 15 of fabric or the like material may be supported in a known manner by an endless grid fitted with chain guides on both sides which engage stationary guide rollers 15a, 15b and 15c and a driving roller 15d, to continuously move the band 15 in the direction of the arrow and to provide upper and lower runs of the band in the manner shown. The driving roller 15d is rotated by a suitable power source or motor (not shown) via a reduction gearing 24 and transmission belt 24a, or in any other suitable manner. In order to produce a vacuum-tight engagement between the upper edges of the chamber 10 and the band 15, conventional liquid-gap or the like vacuum seals may be provided being advantageously structurally combined with the inlet and outlet guides 20 and 21. Similarly lateral seals (not shown) are provided for the band 15, such as of the type shown by the afore-mentioned German patent, or of any other known construction. The vacuum in the chamber 10 is produced by a pump 16 associated with a separator 17 having an outlet 18. The function of the separator 17 is to separate liquid drops or filtrate residue from the air drawn by the pump 16 through the filter section 19 at the bottom of the filter trough.

A drying zone is located behind and above the liquid surface 14 of the filter trough by the provision of a drying device 22 in the form of an air pre-heater above the output or rising extension of the outlet guide 21 of the upper run or trough of the filter band 15.

In constructions according to FIG. 1 with the vacuum chamber 10 being divided into three communicating compartments 11a, 11b, 11c, each compartment is provided with its own filtrate outlet 23a, 23b, 23c, respectively. Aside from other functions, the partitions 10a and 10b in the chamber 10 of FIG. 1 act mainly as reinforcing or stiffening means, to protect the chamber from the ambient excess pressure. The provision of individual filtrate outlets 23a, 23b, 23c has the purpose, among others, of shortening the path of the liquid flow towards the outlet points, to prevent the formation of deposits of solid matter or residue still contained in the filtrate upon the bottom of the chamber 10.

In FIG. 2, the upper run of the filter band, constructed basically in a similar manner as in FIG. 1, comprises a filtration section 19, a washing or rinsing section 30 and a drying section similar to that according to the preceding figure, all said sections being arranged in succession in order named and in respect to the direction of movement of the band 15 indicated by the arrow. While in this case the drying zone, disposed above the liquid level 14a of the rinsing section is again associated as in FIG. 1 with the rising extension of the outlet guide 21, passage of the band 15, above the liquid level, between the filtration zone 19 and the rinsing zone 30 is achieved by a roof-like intermediate portion of the band between said zones produced by the aid of a guide roller 31, whereby in other words to provide separate filtration and rinsing troughs for the zones 19 and 30, in the manner shown. Furthermore, separate vacuum chambers are provided in FIG. 2 for each of the filtration, rinsing and drying zones.

For the latter purpose, the filtration zone 19 in FIG. 2 has its own vacuum chamber 25 associated in vacuumtight connection with the inlet guide 20 and an auxiliary outlet guide 32, chamber 25 being provided with a partial partition 25c to provide compartments 25a and 25b each having its own filtrate outlet 23a and 23b, respectively, in substantially the same manner as the chamber 10 of FIG. 1. Furthermore, in the example shown, the rinsing zone 30 and drying zone have a common vacuum chamber 26 divided by a vacuum-tight partition 26c into two vacuum compartments 26a and 26b for the rinsing and drying zones, respectively. Chamber 26 has an auxiliary inlet guide 33 with the guide 21 acting as outlet guide as in FIG. 1.

There is provided thereby in FIG. 2 behind the liquid surface 14 of the filtration zone 19, in respect to the direction of movement of the band 15, a roof-like guide 31, 32, 33 on the one side of which is located the rinsing zone 30 having associated therewith a conduit for supplying liquid detergent, as indicated by arrow 28, and distributors 29. The filtrate of the rinsing zone is collected in he compartment 26a of vacuum chamber 26 and discharged via its outlet 23c. The drying zone with its own vacuum suction compartment 26b and a filtrate outlet 23d is disposed within the rising portion of the band 15 in the direction of filter outlet guide 21. Each separate vacuum suction chamber or compartment 25b, 26a, 26b has its own pump 16a, 16b, 16c, separator 17a, 17b, 17c, separator outlet 18a, 18b, 18c, and filtrate discharge outlet 23a, 23b, 23c, 23d, respectively.

In FIGS. 3 and 4 are shown devices provided for the additional supply of filter adjuvants to the surface 14 of the filtration zone 19.

Thus, FIG. 3 shows a storage container 35 for the adjuvant including a bucket wheel sluice 36 and a gauging slide 37 which is adjustable in height and through which a layer of filter adjuvants is fed to the band 15 at the intake end thereof so that the sludge supplied by the following distributor passes through the layer of filter adjuvants into the vacuum suction chamber below the band.

FIG. 4 shows a storage container 40 containing an endless gauging feed screw 41 and drive therefor 39 disposed above the distributor 13. In this case, the filter adjuvant is admixed to the sludge or liquid to be filtered.

In the foregoing, the invention has been described in reference to an illustrative and execmplary device. It will be evident, however, that modifications and variations, as well as the substitution of equivalent parts or devices for those shown and described herein for illustration, may be made without departing from the broader scope and spirit of the invention.

I claim:

1. A vacuum band filter comprising in combination
   a continuously moving endless filter band having upper and lower runs, the upper run passing through a first and a second zone,
   spaced inlet and outlet guide means below the upper run whereby said upper run is passed downwardly and then upwardly in each of said two zones to form troughs in said zones;
   first and second liquid-collecting container means in vacuum tight engagement with said upper band and extending below said first and second zones respectively for collecting liquids passed by said band,
   means connecting each of said container means to a source of vacuum,
   additional guide means for the band between said zones, said additional guide means being positioned above the uppermost portions of the adjacent outlet and inlet guides for said troughs,
   and means for feeding liquids to the troughs formed in said first and second zones.

2. A vacuum band filter as claimed in claim 1 wherein the outlet guide means for the second zone extends upwardly to a height above the height of its corresponding inlet guide means, said extension containing openings for the passage of gaseous fluids therethrough, and vacuum means below said openings for drawing gas through the band passing over said openings.

3. The vacuum band filter as claimed in claim 2, comprising means for feeding heated gas to the area above said openings in the outlet guide.

4. The vacuum band filter as claimed in claim 2, wherein the collecting container for the second zone extends below the extended portion of the outlet guide of said second zone, and partition means in said second collector means to separate the fluids passing through said opening from the fluid passing through the trough of the second zone.

5. The vacuum band filter as claimed in claim 1 comprising means for supplying filter aid to the filter band.

6. A vacuum band filter comprising in combination:
 1. a continuously moving endless filter band having lower and upper runs,
 2. inlet, outlet and intermediate roofshaped guide means to form said upper run into a filtration trough followed by a rinsing trough in the moving direction of said band,
 3. means to introduce a liquid to be filtered into said filtration trough,
 4. means to introduce a rinsing liquid into said rinsing trough,
 5. separate liquid-collecting vacuum chambers disposed below said upper run and operably connected with each of said troughs,
 6. means to maintain a different degree of vacuum in said chambers, and
 7. individual liquid discharge means for said chambers.

7. A vacuum band filter as claimed in claim 6, including an upwardly inclined extension of the end section of said rinsing trough, a further vacuum chamber operably connected to the band section within said extension, and means to maintain a predetermined degree of vacuum within said further chamber.

8. A vacuum band filter as claimed in claim 7, including an air pre-heater disposed above said band between said end section of said rinsing trough.

9. A vacuum band filter as claimed in claim 6, in which devices are provided near the intake end of said filtration trough to supply filter adjuvant to the filter band.

* * * * *